Patented Mar. 26, 1946

2,397,391

UNITED STATES PATENT OFFICE 2,397,391

PHENANTHRIDINE DERIVATIVES

Leslie Percy Walls, Teddington, England, assignor to The Imperial Trust for the Encouragement of Scientific and Industrial Research, Westminster, England No Drawing. Application February 2, 1945, Serial No. 575,932. In Great Britain January 3, 1944

15 Claims. (Cl. 260—287)

This invention is for improvements in or relating to the manufacture of phenanthridine compounds, including phenanthridinium salts.

It is known to convert acyl-derivatives of o-xonylamine into phenanthridine compounds in the presence of a pentavalent phosphorus compound, such as phosphorus oxychloride, according to the following scheme:

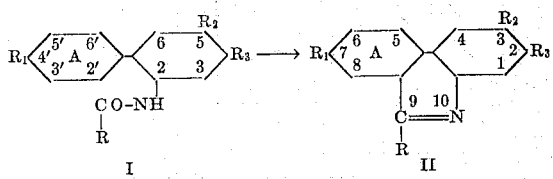

When it is desired to obtain by this method aminophenanthridine compounds, or especially aminophenanthridinium salts, it has heretofore been customary to employ as starting material an o-xenylamine appropriately substituted by one or more nitro groups. However, while the method is of wide application, there are encountered, in certain cirsumstances, definite limitations. Thus, in the above formulae, when the ring A contains a nitro group in, for example, the 4' position, the well-known electrochemical character of this group causes a notable diminution in reactivity of the hydrogen atoms of the same ring. As a consequence, ring-closure which depends on the detachment of the hydrogen atom in the 2'-position proceeds very slowly. This difficulty has been largely overcome in many cases by effecting the cyclisation in the presence of nitrobenzene or other unreactive liquid of similar boiling point, whereby higher temperatures may be employed. In certain instances, however, fission of the acylamino group—NH.COR proceeds concomitantly with cyclisation and perhaps at a greater rate, so that the yield of phenanthridine compound is very small; this is notably the case when $R_1=NO_2$ and $R=CH_3$ or $o\text{-}NO_2C_6H_4$. Moreover, the amino compound liberated by the side-reaction is destroyed by the phosphorus oxychloride.

According to the present invention the aforesaid difficulties are overcome by replacing the nitro group by a carbamic ester radical.

The present invention, therefore, consists broadly in the manufacture of phenanthridine derivatives by the cyclisation, by means of a pentavalent phosphorus compound, of an acylated o-xenylamine having one or more nuclearly substituted carbamic ester radicals, preferably in the form of carbalkoxyamido groups.

In the process of the present invention, ring-closure to the desired phenanthridine often proceeds rapidly and smoothly during a few minutes' heating with phosphorus oxychloride alone, although in some cases it is desirable to conduct the reaction in the presence of nitro-benzene or other non-reactive liquid of high boiling point. This important advantage over the use of the corresponding nitro compounds is perhaps attributable to the fact that the carbamic ester radical —NH.CO.OR is of oppositie electrochemical character to the nitro group so that the reactivity of the hyrogen atoms of the ring in which the said group is substituted may be enhanced rather than diminished. Moreover, the carbamic ester radical satisfactorily withstands the vigorous conditions of the cyclisation process and yet is readily convertible into an amino group in high yield.

The urethanes obtained by the process of the present invention are readily isolated as crystalline substances which readily hydrolyse to yield the free primary amines, for example, on heating with moderately concentrated sulphuric acid. Furthermore, these urethanes may be converted into aminophenanthridinium salts by a variety of methods, some of which are specifically described in the following examples. An important feature of this invention comprises quaternating the urethanes obtained by the process above described and thereafter hydrolysing to form the corresponding amino-phenanthridinium salt.

The process of the present invention may be utilised for the production of important phenanthridine derivatives with mixed substituents. For example, by appropriate manipulation, there may be obtained phenanthridinium salts of the general formula:

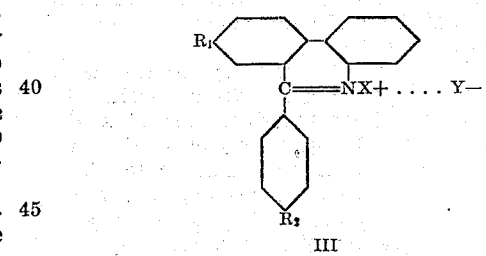

in which $R_1$ may represent $NH_2$, $NHCOCH_3$ or $NHCOOEt$, while $R_2$ may be $NO_2$ or $NH_2$, and the combinations and variations are obviously numerous. Similarly the process provides a new route through the compound of this general formula wherein $R_1=NHCOOEt$ and $R_2=NO_2$ to the important compound where $R_1=R_2=NH_2$.

The process of the present invention is illustrated by the following non-limitative examples, several of which describe the preparation of compounds having powerful trypanocidal and bactericidal properties. Parts are by weight except where otherwise stated, weight to volume being as grams to mls. The melting points are corrected:—

Example I 2-acetamido-4'-nitrodiphenyl (Scarborough and Waters, J. Chem. Soc., 1927, 89) was reduced to the amino-compound with iron and water containing a trace of acid. The product, 2-acetamido-4'-aminodiphenyl crystallised in high yield from benzene in transparent pink prisms, M. P. 116° C. Carbethoxylation was conveniently effected as follows (cf. Leslie and Turner, J. Chem. Soc., 1933, 1588): 18 parts of the amine and 3 parts of diethylaniline were dissolved in 45 parts by volume of alcohol and treated with 2 parts of ethyl chloroformate and gently refluxed for 30 minutes. The reaction mixture was poured into N-hydrochloric acid whereupon the urethane

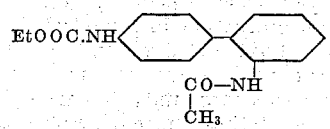

was precipitated as a white micro-crystalline powder in good yield. It was recrystallised from industrial alcohol in glistening talc-like leaves, M. P. 161° C. The urethane (10 parts) and phosphorus oxychloride (30 parts by volume) were refluxed together gently for 1 hour and then poured into ice-water and neutralized by ammonia. The product was dissolved in cold N-sulphuric acid, filtered from a small amount of impurity, and then reprecipitated from the filtrate by neutralisation as a white micro-crystalline powder (9 parts). The phenanthridine

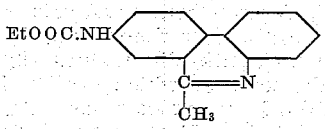

thus obtained crystallized from industrial spirit in almost white glistening needles, M. P. 205° C.

Its hydrolysis to the primary amine was effected by known methods: a solution of 2 parts in 10 parts by volume of concentrated sulphuric acid to which had been added 5 parts by volume of water was heated to 140–160° C. until effervescence ceased. The solution was diluted with water and the amine precipitated in quantitative yield by neutralisation. It crystallised from a large volume of alcohol in buff-coloured prisms of M. P. 226° C.

Its acetyl-derivative obtained by reaction with acetic anhydride crystallised from alcohol in transparent buff-coloured prisms, M. P. 246.5° C., quaternation of which was readily effected in nitrobenzene solution with methyl sulphate. The methochloride M. P. 272.5° C. decomposes, which crystallised from water in clumps of yellow needles, was hydrolysed by hydrochloric acid, and from the mother liquor by neutralisation and treatment with sodium iodide, 7-amino-9:10-dimethylphenanthridinium iodide was isolated in acicular brown prisms, M. P. 262° C. (decomp.).

Example II 2-nitro-4:4'-dicarbethoxyamidodiphenyl, prepared by the method of Leslie and Turner (loc. cit.), was reduced to the amino-compound by iron and acidulated water or in an autoclave by hydrogen under pressure with a platinic oxide catalyst. The amine crystallised from alcohol in somewhat discoloured acicular prisms, M. P. 186° C. On being warmed with acetic anhydride acetylation of the amine readily occurred with crystallisation of its acetyl-derivative from the reagent in minute white needles, M. P. 185° C.

Cyclisation of this substance was effected as in Example I by means of phosphorus oxychloride and the product, 2:7-dicarbethoxyamido-9-methylphenanthridine, worked up in the same way, crystallised in over 70 per cent yield from nitrobenzene in the form of small pale yellow plates, M.P. 252° C. Hydrolysis as in Example I yielded 2:7-diamino-9-methylphenanthridine which crystallised from a large volume of alcohol in glistening yellow leaves, M. P. 264–265° C.

When the dicarbethoxyamido-compound (2 parts) in nitrobenzene (16 parts by volume) at 160° C. was treated with methylsulphate (1 part by volume) 2:7-dicarbethoxyamido-9:10-dimethylphenanthridinium metho-sulphate crystallised out in high yield. This salt was extremely soluble in water, but could be re-crystallised from alcohol in small transparent deep yellow prisms unmolten at 320° C. Its hydrolysis was readily effected by sulphuric acid: 2 parts were dissolved in 3 parts by volume of sulphuric acid (2 acid: 1 water) and heated at 135° C. for 20 minutes. When the solution was diluted with water a brick-red acid sulphate crystallised, but on neutralisation by ammonia a purple solution was obtained, which furnished on addition of potassium bromide dark purple glistening plates of 2:7-diamino-9:10-dimethylphenanthridinium bromide, M. P. (decomp.) 285° C., in high yield. The chloride could likewise be salted out by sodium chloride, but owing to its extreme solubility in water was contaminated by inorganic salt.

Example III

Crude 2:4'-dinitrodiphenyl (contaminated inter alia with the 4:4'-isomer) was prepared according to the method of Bell and Kenyon (J. Chem. Soc., 1926, 2705) and was reduced by sodium polysulphide to crude 2-nitro-4'-aminodiphenyl. Purification of the product depended on the sparing solubility of the hydrochloride of the amine in cold water, and was conveniently accomplished as follows: the crude base was dissolved in hot dilute hydrochloric acid and clarified with charcoal. From the cooled solution the hydrochloride of 2-nitro-4'-aminodiphenyl crystallised out, leaving its isomer and other impurities in solution. Carbethoxylation of the base by the method of Example I yielded 2-nitro-4'-carbethoxyamidodiphenyl (yellow plates from alcohol, M. P. 105.5° C.), and subsequent reduction of the nitro-group of this derivative by iron and water proceeded smoothly. The product, 2-amino-4'-carbethoxyamidodiphenyl (buff prisms, M. P. 98° C. from benzene lingroin) condensed with p-nitrobenzoyl chloride in pyridine solution, and the product (Formula I, $R=p\text{-}NO_2C_6H_4$, $R_1=NO_2$, $R_2=R_3=H$) crystallised from alcohol in transparent yellow plates, M. P. 184° C. (sometimes a different form separated in almost colourless needles).

Cyclisation to 7-carbethoxy-amido-9-p-nitrophenylphenanthridine proceeded by the method of the previous examples and the product crystallised from pyridine in clumps of feathery yellow needles, M. P. 253.5° C. (decomp.). A preferred method of condensation of 2-p-nitrobenzamido- 4'-carbethoxyamidodiphenyl was to heat 11 parts at 150° C. for 1½ hours with 22 parts by volume of phosphorus oxychloride and 36 parts by volume of nitrobenzene. Decomposition of the reaction mixture with ice-water caused 6.5 parts of the desired product to crystallise from the nitrobenzene, and a further quantity could be obtained from the mother liquor. By hydrolysis, 7-amino-9-p-nitrophenylphenanthridine was obtained and this crystallised from nitrobenzene in deep red transparent plates, M. P. 273.5–275.5° C. When this amine was acetylated in pyridine solution by means of acetic anhydride, the 7-acetamido-derivative crystallised out in yellow needles, M. P. 282° C., the yield being almost theoretical.

Quaternation of this substance and of the foregoing carbethoxyamido-derivative by the method described in the previous example, but preferably at 180–200° C. afforded the quaternary salts, 7-acetamido and 7-carbethoxyamido-9-p-nitrophenyl - 10 - methylphenanthridinium methosulphates, the melting-decomposition points being respectively 269° C. and 209° C. Both salts may be hydrolsed by dilute sulphuric acid (2:1) at 135° C. to furnish, for example, the red crystalline salt 7-amino-9-p-nitrophenyl-10-methylphenanthridinium chloride, M. P. (decomp.) 245° C. Reduction of the salts with iron and water gave on addition of sodium chloride 7-acetamido- and 7-carbethoxyamido-9-p-aminophenyl-10-methylphenanthridinium chloride of M. P. (decomp.) 256° C. and 300° C. respectively. From the former, by carbethoxylation, 7-acetamido-9-p-carbethoxyamidophenyl - 10 - methylphenanthridinium chloride could be obtained in golden yellow plates, melting approximately at 205° C., and from the latter by acetylation 7-carbethoxyamido-9-p-acetamidophenyl-10-methylphenanthridium chloride in yellow prisms, M. P. (decomp.) 216° C.

By similar conversions other salts of various types may be obtained. The salts described in this example are all well-defined crystalline substances, soluble in water, and the yields are excellent.

*Example IV*

Condensation of 2-amino-4'-carbethoxyamidodiphenyl and o-nitrobenzoyl chloride in pyridine solution afforded 2-o-nitrobenzamido-4'-carbethoxyamidodiphenyl which crystallised from industrial spirit in almost colourless prisms, M. P. 197° C. with effervescence.

5 parts of this acyl-derivative and 10 parts by volume of phosphorus oxychloride were heated on the steam bath for one hour, and then poured cautiously into ice-cooled dilute ammonia. The solid thus obtained was extracted from dark-coloured impurities by boiling benzene, and the residue left after evaporation of this solvent was crystallised from industrial spirit in golden yellow acicular prisms, M. P. 199° C. in over 60 per cent yield. Hydrolysis of this carbethoxyamido derivative with sulphuric acid furnished 7-amino-9-o-nitrophenylphenanthridine which crystallised from chlorobenzene in transparent brown prisms, M. P. 227.5° C.

The amine (5 parts) was made into a paste with 10 parts by volume of hot glacial acetic acid and treated with 4 parts by volume of acetic anhydride. A clear solution was at first obtained, but the acetyl-derivative subsequently crystallised out in almost quantitative yield, as white prisms, M. P. 288° C.

When 20 parts of either the carbethoxyamido-derivative of M. P. 199° C. or this acetyl derivative of M. P. 288° C. in 150 parts by volume of nitrobenzene at 150° C. were treated with 7 parts by volume of methylsulphate, rapid methylation occurred, and in each case the quaternary salt crystallized out of the reaction mixture in high yields. That from the former, 7-carbethoxyamido-9-o-nitrophenyl - 10 - methylphenanthridinium methosulphate, crystallised from water in transparent yellow plates. Its reduction in alcoholic solution by stannous chloride afforded 7-carbethoxyamido-9-o-aminophenyl - 10 - methphenanthridinium chloride, which crystallised from water in light brown prisms, M. P. (decomp. 272° C. Acetylation of this salt afforded 7-carbethoxyamido-9-o-acetamidophenyl-10-methylphenanthridinium chloride melting indefinitely at 200–205° C. with decomposition; the salt readily hydrolysed by sulphuric acid (2 parts acid to 1 part water) at 150° C.; after dilution with water and neutralisation with alkali 7-amino-9-o-nitrophenyl - 10 - methylphenanthridinium sulphate crystallised out in light red prisms, easily soluble in water.

Reduction of this nitro-amino-quaternary salt by iron and water and addition of an inorganic chloride converted it into 7-amino-9-o-aminophenyl - 10 - methylphenanthridinium chloride, which crystallised from water in ruby-red prisms, melting over the range 156–161° C.

A similar series of products was furnished by 7-acetamido-9-o-nitrophenyl-10-methylphenanthridinium methosulphate, which crystallises from water in matted deep yellow needles, M. P. (decomp.) 220° C. Reduction with stannous chloride afforded 7 - acetamino-9-o-aminophenyl-10-methylphenanthridinium chloride in matted yellow needles M. P. (decomp.) 271° C. By acetylation of this substance or of the diamino-quaternary salt with acetic anhydride 7-acetamido-9-o-acetamidophenyl - 10 - methylphenanthridinium chloride was obtained in buff prisms, easily soluble in water and melting with decomposition at 241° C. The quaternary salts described in this example were obtained in excellent yields.

*Example V*

Condensation of 2-amino-4:4'-dicarbethoxyamido-diphenyl (10 parts) and benzoyl chloride (2.8 parts by volume) readily occurred during 1 hour's heating in chlorobenzene (40 parts by volume). With cooling the benzoyl-compound separated, and was purified by crystallisation from ethyl acetate in white prisms (about 10 parts) of M. P. 147° C. Cyclisation of this product by the method of Example I furnished 2:7-dicarbethoxyamido-9-phenylphenanthridine, which likewise could readily be quaternated in nitrobenzene at 160° C. by methylsulphate, 2:7-dicarbethoxyamido-9-phenyl-10-methylphenanthridinium methosulphate crystallising out in theoretical yield; recrystallisation from alcohol afforded glistening yellow needles, M. P. (decomp.) 278° C. Hydrolysis by sulphuric acid, followed by neutralisation with ammonia and addition of potassium bromide furnished the important trypanocide, 2:7-diamino-9-phenyl - 10 - methylphenanthridinium bromide, of which the over-all yield was very good.

I claim:

1. A process for the manufacture of phenanthridine derivatives which comprises the cyclization, by means of a pentavalent phosphorus halide of a 2-acylamidodiphenyl having at least one carbamic ester radical as substituent on another ring carbon atom and having the 2'-position free.

2. A process for the manufacture of phenanthridine derivatives which comprises the cyclization, by means of a pentavalent phosphorus halide, of a 2-acylamidodiphenyl containing a carbamic ester radical in the 4'-position.

3. A process for the manufacture of phenanthridine derivatives which comprises the cyclization by means of phosphorus oxychloride of a 2-acylamidodiphenyl which contains a carbamic ester radical as the sole substituent on a ring carbon atom and which is unsubstituted in the 2'-position.

4. A process for the manufacture of phenanthridine derivatives which comprises the cyclization, by means of a pentavalent phosphorus halide, of a 2-acylamidodiphenyl having at least one carbalkoxyamido group as substituent on another ring carbon atom and having the 2'-position free.

5. A process for the manufacture of phenanthridine derivatives which comprises the cyclization by means of phosphorus oxychloride of a 2-acylamidodiphenyl which contains at least one carbalkoxyamido group each as the sole substituent on a ring carbon atom and which 2-acylamidophenyl is unsubstituted in the 2'-position.

6. A process for the manufacture of phenanthridine derivatives which comprises the cyclization, by means of phosphorus oxychloride, of a 2-acylamidodiphenyl containing a carbethoxyamido group in the 4'-position.

7. A process for the manufacture of aminophenanthridine derivatives which comprises the cyclization by means of a pentavalent phosphorus halide of a 2-acylamidodiphenyl having at least one carbamic ester radical each as the sole substituent on a ring carbon atom and which 2-acylamidodiphenyl is unsubstituted in the 2'-position, and converting by hydrolysis the compound group of the resulting urethane into an amino group.

8. A process for the manufacture of aminophenanthridine derivatives which comprises the cyclization by means of a pentavalent phosphorus halide of a 2-acylamidodiphenyl which contains a carbalkoxyamido group as the sole substituent on one of the ring carbon atoms, and which 2-acylamidodiphenyl is unsubstituted in the 2'-position, and hydrolysing the resulting urethane to remove the carbalkoxy radical thereby forming a corresponding amino phenanthridine compound.

9. A process as claimed in claim 8 wherein the said carbalkoxyamido group is the carbethoxyamido group.

10. A process for the manufacture of aminophenanthridinium salts which comprises the cyclization of a 2-acylamidodiphenyl having a carbamic ester radical as the sole organic substituent on at least one of the ring carbon atoms, and which 2-acylamidodiphenyl is unsubstituted in the 2'-position, quaternating the resulting urethane and hydrolysing the quaternary salt thus obtained to convert the urethane group into an amino group, and isolating from the reaction mixture an aminophenanthridinium salt.

11. A process for the manufacture of aminophenanthridinium salts which comprises the cyclization by means of a pentavalent phosphorus halide of a 2-acylamidodiphenyl containing carbalkoxyamido as the sole substituent on at least one ring carbon atom with the 2'-position free, quaternating the resulting urethane and converting by hydrolysis the urethane group into an amino group.

12. A process for the manufacture of aminophenanthridinium salts which comprises the cyclization by means of phosphorus oxychloride of a 2-acylamidodiphenyl containing carbethoxyamido as the sole organic substituent on at least one of the ring carbon atoms with the 2'-position free, quaternating the resulting urethane and hydrolysing the quaternary salt thus obtained to remove the carbethoxy group.

13. A process as claimed in claim 12 wherein the cyclization is effected in the presence of a liquid selected from the group consisting of nitrobenzene and other unreactive liquids of high boiling point.

14. A process as claimed in claim 13 wherein the cyclization is effected in the presence of a liquid selected from the group consisting of nitrobenzene and other unreactive liquids of high boiling point.

15. A process as claimed in claim 12 wherein the cyclization is effected in the presence of a liquid selected from the group consisting of nitrobenzene and other unreactive liquids of high boiling point.

LESLIE PERCY WALLS.